Figure 1:
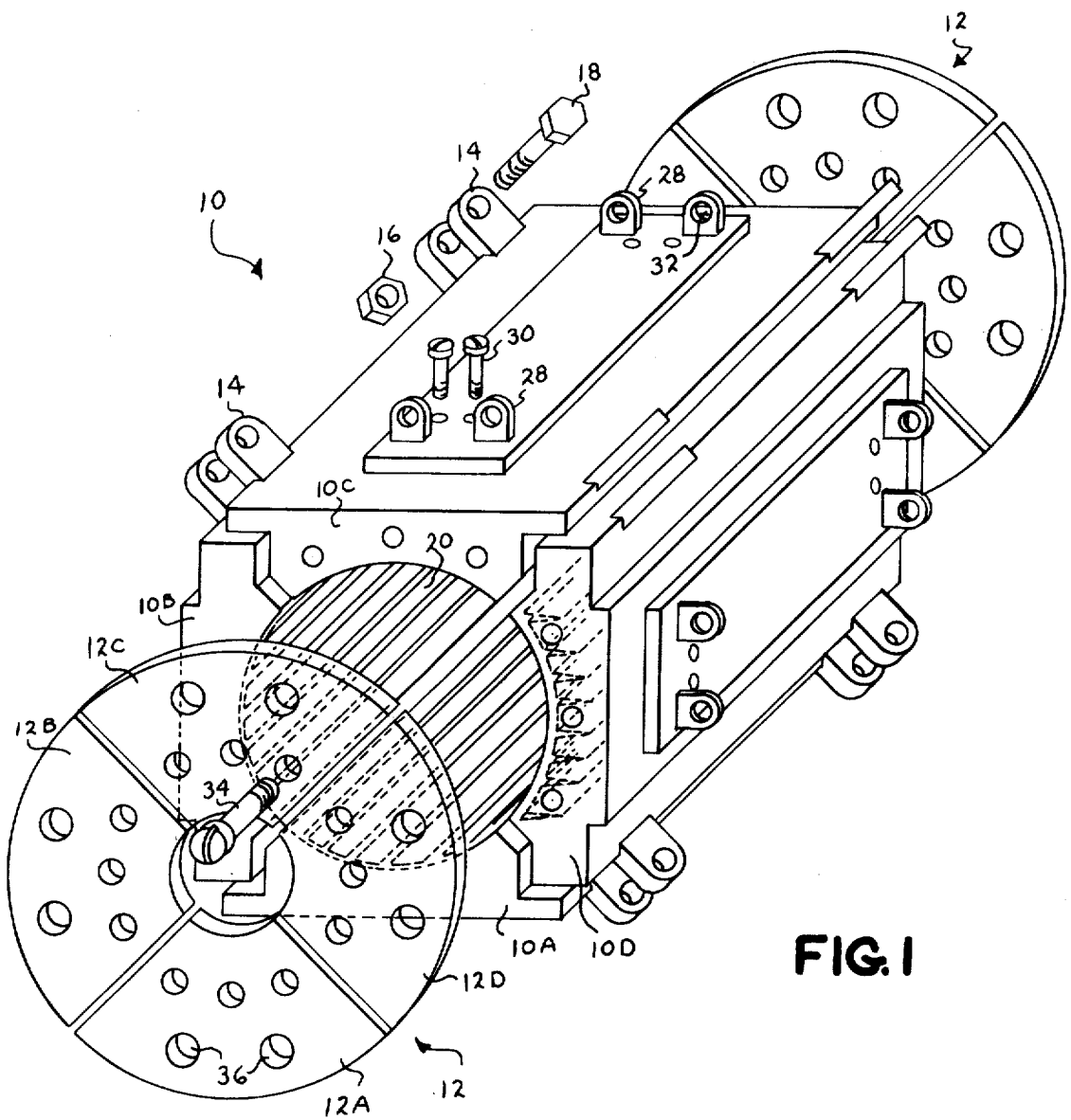

United States Patent [19]
Baumann et al.

[11] 3,741,707
[45] June 26, 1973

[54] DISMEMBERABLE MOLD FOR CENTRIFUGALLY CASTING FINNED STRUCTURES

[75] Inventors: Frederick W. Baumann; William C. La Bahn, both of Scotia; Robert G. MacNary, Elnora; Albert R. Miller, Albany, all of N.Y.

[73] Assignee: General Electric Company, Schenectady, N.Y.

[22] Filed: Jan. 24, 1972

[21] Appl. No.: 220,286

[52] U.S. Cl. ............... 425/435, 264/311, 425/182, 425/441, 164/175, 164/292, 164/299
[51] Int. Cl. ........................................... B29c 5/04
[58] Field of Search ................... 425/435, 182, 188, 425/441; 264/311; 164/175, 178, 292, 299

[56] References Cited
UNITED STATES PATENTS

| | | | |
|---|---|---|---|
| 1,474,881 | 11/1923 | Barkschot | 264/311 |
| 1,528,518 | 3/1925 | Watson | 264/311 |
| 2,863,205 | 12/1958 | Seamon et al. | 425/435 X |
| 3,263,285 | 8/1966 | Pojecki | 425/435 X |
| 3,655,309 | 4/1972 | Hepner | 425/435 X |
| 3,692,457 | 9/1972 | Pekor | 425/435 |

*Primary Examiner*—Robert L. Spicer, Jr.
*Attorney*—Vale P. Myles et al.

[57] ABSTRACT

Finned motor frames above 10 inches in diameter are centrifugally cast utilizing a mold formed of four individual cast iron sections each having approximately a quadrant of an enlarged annular plate secured at opposite ends thereof to provide circular wheels for rotation of the mold. The quadrants of the plate, in association with orthogonal seating surfaces at the edges of the mold sections, provide coarse centering of the mold sections as the sections are assembled while fine centering of the sections to produce a smooth circumferential edge on the plate is achieved by tightening bolts extending orthogonally through eyelets protruding substantially radially outward at the edges of each mold section. Brackets also are provided along the exterior surface of each mold section to strip the mold from the cast motor frame by the application of lateral force to the brackets.

13 Claims, 6 Drawing Figures

PATENTED JUN 26 1973

3,741,707

SHEET 1 OF 4

DISMEMBERABLE MOLD FOR CENTRIFUGALLY CASTING FINNED STRUCTURES

This invention relates to a mold for centrifugally casting irregularly surfaced structures and in particular, to a sectionalized mold adaptable to easy dismemberment subsequent to centrifugal casting of large diameter finned structures.

In the manufacture of dynamoelectric machines, a number of diverse techniques have been proposed and/or utilized to fabricate the motor frame dependent upon such factors as the size and number of frames to be cast. For example, high pressure die casting techniques heretofore have been employed to produce machine frames below approximately 10 inches in diameter on a high volume basis. Because of the significant cost entailed in the manufacture of dies for high pressure casting, motor frames above 10 inches in diameter generally have not been formed by high pressure die casting but rather typically have been formed by sand casting or extrusion techniques. Sand casting of machine frames, however, requires the time consuming preparation of a sand mold for each cast (with the sand mold necessarily being destroyed after each cast) while fabrication of a machine frame from extruded arcuate segments of the frame requires welding of the segments to form the cylindrical frame.

While centrifugal casting techniques have been known for many years, such techniques generally have been limited to the casting of relatively smooth surfaced structures and molds used for centrifugal casting typically have been formed of no more than approximately two sections to inhibit leakage of molten metal at the mold seams during casting. Because of the discontinuity necessarily associated with sectionalized centrifugal casting molds, the rotary drive for these molds customarily has been situated at a single end of the mold with the end of the mold remote from the drive remaining open to accept molten metal to be cast. When these molds are utilized to cast large diameter structures, the mold generally is securely fastened to the drive (because of the force multiplying effect of the cantilevered mold) and removal of the mold from the drive often is difficult and time consuming to accomplish.

It is therefore an object of this invention to provide a novel multi-sectioned mold suitable for centrifugally casting structures having a plurality of protrusions along the structure surface.

It is also an object of this invention to provide a novel centrifugal casting mold which is self-aligning upon assembly.

It is a further object of this invention to provide a centrifugal casting mold which can be readily removed from the mold rotary drive.

It is a still further object of this invention to provide a multi-sectioned centrifugal casting mold wherein the mold drive wheels serve as a base to support individual mold sections upon dismemberment.

These and other objects of this invention generally are achieved by a centrifugal casting mold characterized by a plurality of mold sections having arcuate segments of annular plates fixedly secured along the length to each mold section. When the mold sections are juxtaposed to form a circularly closed surface for casting, the arcuate segments of the annular plates are aligned relative to each other to provide a circular surface permitting rotation of the mold upon the segmented annular plates. Preferably, the annular plates are disposed at both ends of the mold sections permitting the plates to serve additionally as support bases for the mold sections upon dismemberment of the mold.

Figure 2:
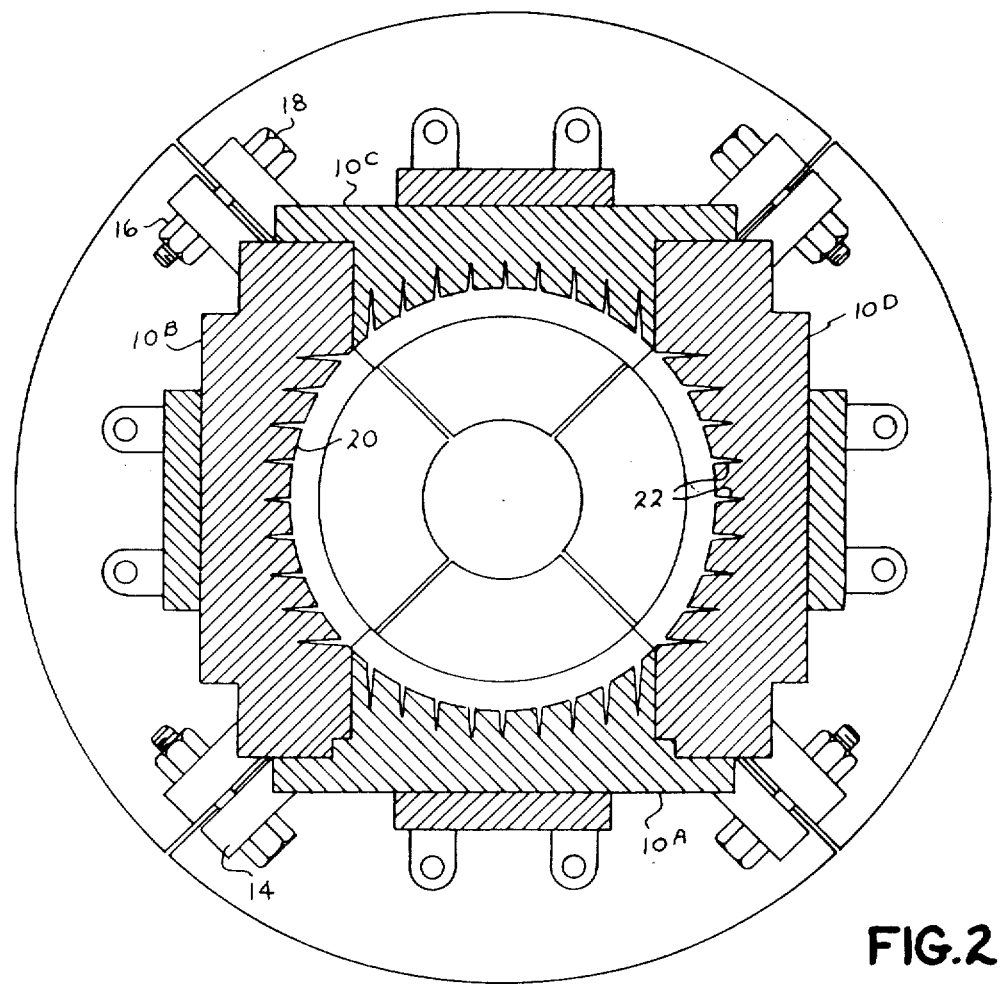
Figure 4:
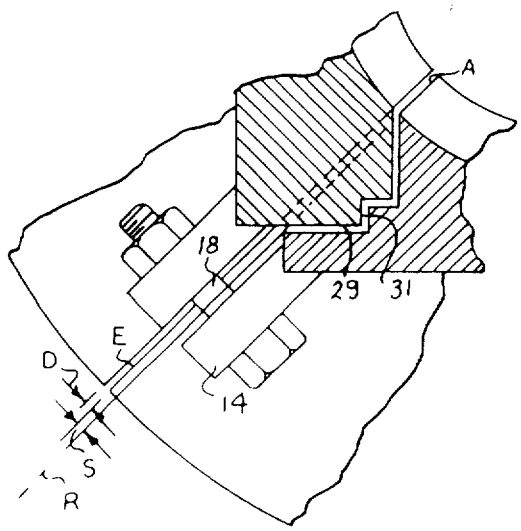
Figure 3:
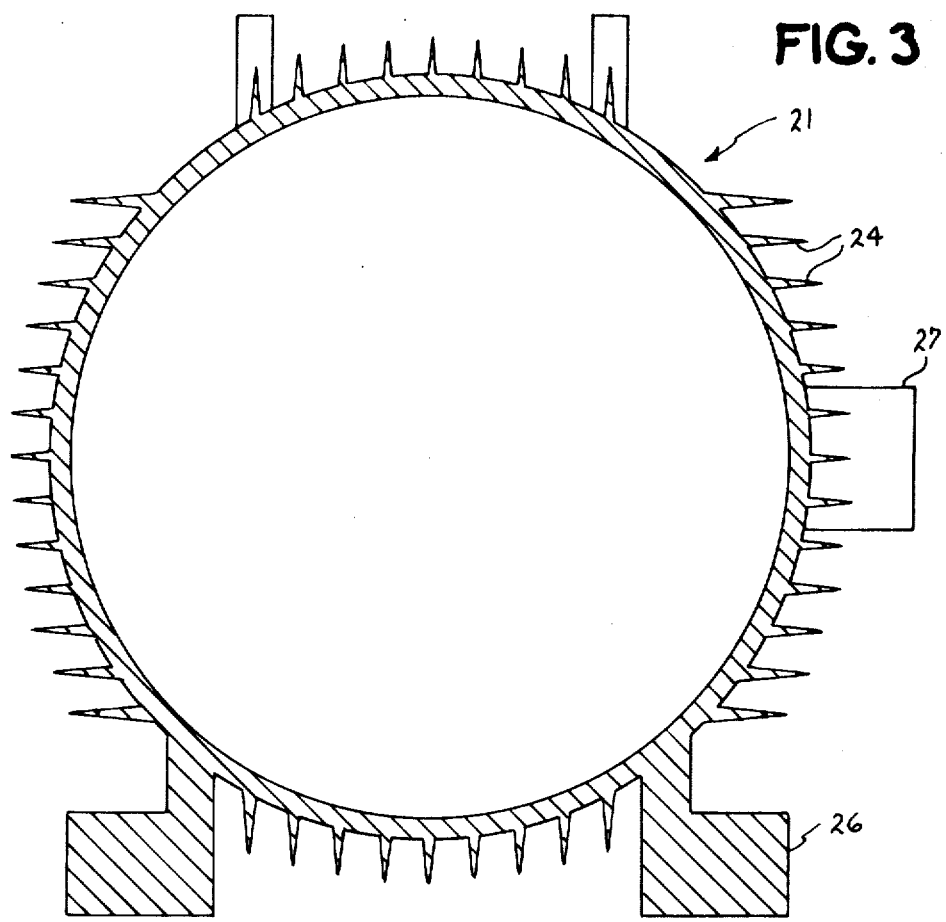
Figure 6:
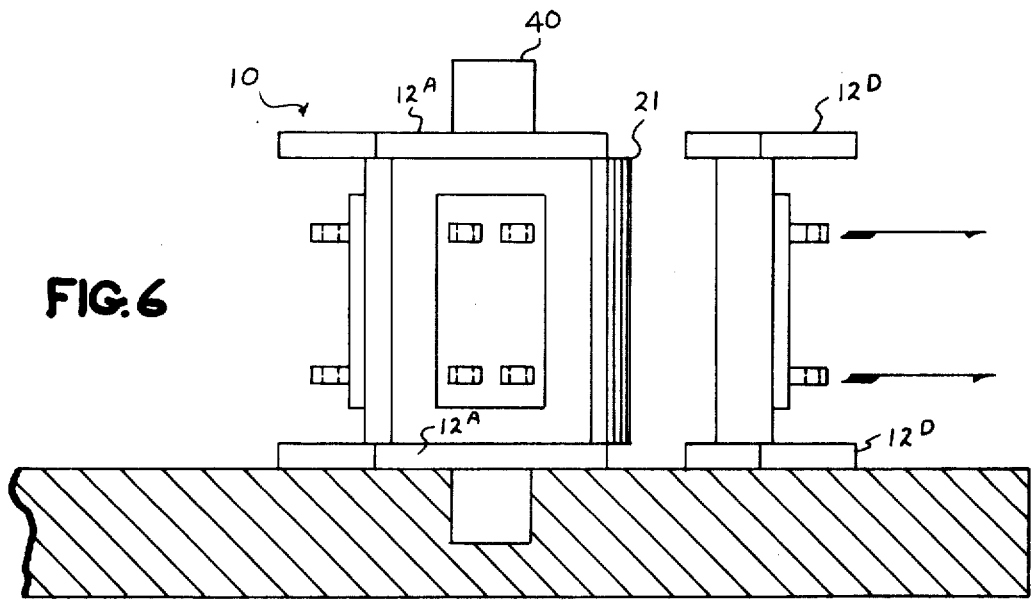
Figure 5:
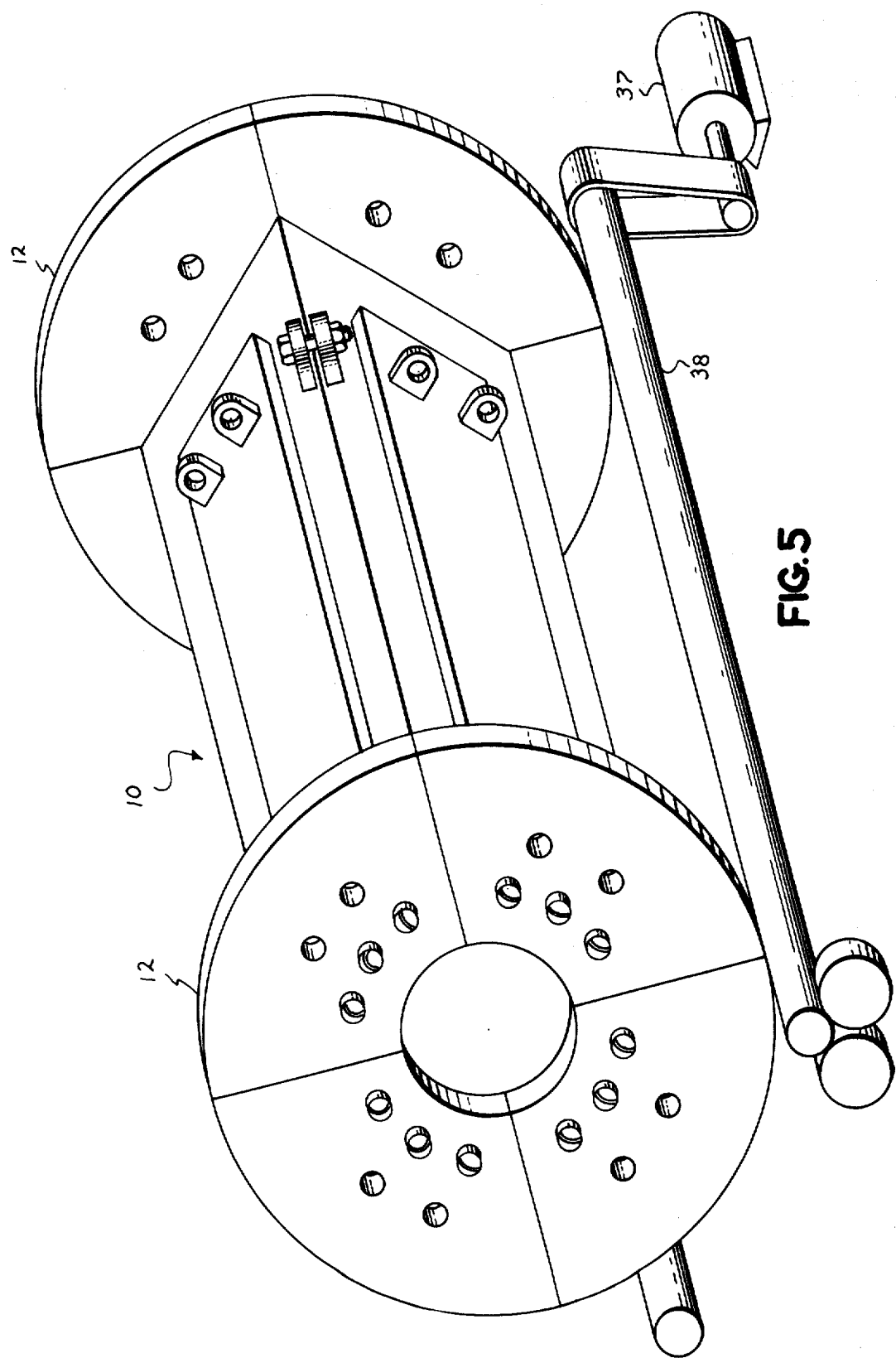

Although the invention is described with particularity in the appended claims, a more complete understanding of the invention may be obtained from the following detailed description of a specific embodiment of the invention taken in conjunction with the appended drawings wherein:

FIG. 1 is an exploded, isometric view of mold formed in accordance with this invention, FIG. 2 is a sectional view of the mold taken along a plane perpendicular to the mold axis, FIG. 3 is a sectional view of a motor frame formed by the mold of FIG. 1, FIG. 4 is an enlarged view illustrating the desired edge seating of adjacent mold sections to assure a seal at the seam between mold sections, FIG. 5 is an isometric view of the mold illustrating apparatus for rotating the mold upon the annular plates at opposite ends of the mold, and FIG. 6 is a plan view illustrating a preferred technique for dismembering the mold.

A four-section mold 10 for casting motor frames in accordance with this invention is illustrated in FIGS. 1 and 2 and generally includes four individual mold sections 10A–10D disposed with adjacent edges in juxtaposition to form a continuous cylindrical inner surface complimentary in configuration to the outer surface of the motor frame to be cast. Arcuate segments 12A–12D of annular plates 12 are fixedly secured to opposite ends of each mold section and form circular wheels for the mold upon juxtaposition of the sections. Each of the mold sections also are provided with two eyelets 14 extending approximately radially outward along each edge of the mold to permit mechanical joining of the mold sections by nuts 16 and bolts 18 passing through eyelets of adjacent sections. Preferably, the mold sections are formed of cast iron because of the good release and thermal shock characteristics of cast iron as well as the relative ease with which such material can be cast, while annular plates 12 desirably are formed of a harder material, such as steel, to inhibit rapid wear or deformation of the wheel surfaces during casting.

Each mold section 10A–10D has an arcuately contoured inner face to form, upon juxtaposition of the sections, a substantially continuous cylindrical surface 20 approximately equal in diameter to the desired size of motor frame 21 (illustrated in FIG. 3) to be cast in the mold, while a plurality of approximately triangularly shaped grooves 22 extend at a parallel attitude into each mold section to produce axial fins 24 on the cast motor frame. As is conventional in the casting art, grooves 22 as well as the mold surfaces employed to form motor frame feet 26 and power connection box 27 preferably have a draft angle (i.e., taper of the surface edges relative to a horizontal or vertical plane) between 3° and 5° to permit stripping of the mold sections from the cast frame. In general, the number and density of the grooves in the mold are determined by the cooling requirements for the motor. For a 24 inch air cooled induction motor frame, however, approximately 68–72 fins extending substantially the axial length of the motor frame and having a height ranging from approximately 1 inch to 2 ½ inches typically are employed for cooling.

To permit stripping of the mold sections from the cast motor frame, axially displaced brackets 28 are fixedly secured by bolts 30 to the outer surface of each mold section. These brackets preferably are provided with apertures 32 to permit the application of a lateral force through the brackets to the attached mold sections. It will be obvious, however, that any other suitable means, e.g., a ridged protrusion designed for engagement by reciprocally driven clamping jaws, also could be utilized to apply lateral force to the mold sections for stripping the sections from the cast motor frame.

As can be seen more clearly in FIG. 4, the confronting edges of each mold section are orthogonally stepped in at least one location to form a sealed seam for confinement of the liquid metal within the mold during centrifugal casting. With eyelets 14 protruding substantially radially outward from the edges of each mold section to accept orthogonally disposed bolts 18, the bolts extend at an approximately 45° angle relative to the planes of the orthogonal steps at the mold edges to permit two-dimensional movement of the sections, e.g., along planes 29 and 31 of the steps, for automatically fine centering the juxtaposed sections upon tightening of bolts 18.

Returning again to FIGS. 1 and 2, each mold section has an arcuate segment of annular plate 12 secured at opposite ends thereof by screws 34 extending axially into each mold section. Desirably, the arcuate segments extend radially outward from the mold sections beyond any protruding surface of the section, i.e., brackets 28 and eyelets 14, to permit rotation of the mold upon the wheels formed by juxtaposition of the mold sections. If desired, holes 36 can be provided in the wheel sections to permit access to stripping brackets 28 by suitable rods, not shown, axially removed from the mold.

The radially inward extension of the arcuate segments desirably substantially exceeds that required solely for confinement of the molten metal to provide coarse centering the mold sections upon assembly of the mold. To effect this centering of the sections, the edge of each arcuate segment preferably lies along radial lines (or lines parallel to radial lines) defining the ends of the cylindrical arc of inner surface 20 of the mold section to which the arcuate segment is attached. While substantially quadrature segments are preferred for the wheel segments, other complimentary angular dispositions of plate segments also could be employed to achieve a degree of self-alignment in the mold sections, e.g., the plate could be divided into two plate segments spanning arcs of 80° intermediate two plate segments spanning arcs of 100°. Desirably, the edges of the plate segments should be offset at least ¼ inch from the seam between mold sections to inhibit leakage of molten metal through aligned edges of the mold sections and plate segments. Thus, with radial dissections A at the edges of inwardly extending lips formed at each end of the mold sections lying along a 45° radius R upon juxtaposition of the plates, the edges of the plate segments preferably are parallel to the 45° radius R and offset therefrom by a small amount S, e.g., approximately ½ inch. A small distance D, i.e., less than ¼ inch and typically 1/16 inch, normally also is provided between arcuate segments of the annular plate when the mold sections are assembled to assure that the plate segments do not interfere with abuttment of the axially extending edges of the mold sections. Plate segment edges parallel to radially extending eyelets 14 also produce an orthogonal disposition between the plate segment edges and bolts 18 extending through the eyelets to maximize the force of the bolts in a direction tending to close the plate segments upon each other. Moreover, when the plate segment edges are parallel to a radius disposed at a 45° angle to orthogonal faces 29 and 31, the force of bolts 18 upon the mold sections is equally distributed between the planes of these faces resulting in a uniform closure of the mold sections upon each face of the mold seam. Because of the large radial expanse of the annular plate segments, the segments also can function as a base for each mold section to permit the sections to stand unsupported on edge (for reasons which will be more fully explained hereinafter).

During casting, mold 10 is placed in an approximately horizontal position, as shown in FIG. 5, with annular plates 12 formed by juxtaposition of the mold sections resting upon a motor 37 driven roller 38 to permit rotation of the mold at a desired speed for casting, e.g., 400 rpm. Molten aluminum then is deposited within the mold by any suitable means for effecting this result and the molten aluminum is centrifugally forced into groves 22 formed within the mold surface to produce the finned motor frame of FIG. 3. Because the mold is not fixedly secured to the mold drive rollers, the mold can be readily removed from the rollers after solidification of the aluminum and placed in a vertical disposition atop an arbor 40, as illustrated in FIG. 6. After bolts 18 have been removed from the mold, the mold sections are stripped from the cast by the application of a suitable force, e.g., 50 tons, to the stripping brackets on the mold. Because of the large radial expanse of plate segments 12A–12D, these segments provide a base for each mold section and the section can stand without additional support after stripping. When all the mold sections have been removed from the cast motor frame and the motor frame moved to a location for further processing, the mold can be reassembled by pushing each mold section radially inward toward arbor 40. The approximately radially extending edges of the quadrature plate sections permit coarse centering of the mating edges of the juxtaposed mold sections as the sections are pushed into position while fine centering of the mold sections to assure a smooth circumference for annular plate 12 is achieved by tightening bolts 18 extending through eyelets 14. Because the bolts are disposed at an approximately 45° angle relative to the faces of the orthogonal steps forming the seats for the edges of the juxtaposed mold sections, two dimensional centering of the mold sections is assured upon tightening of bolts 18.

The reassembled mold then can be placed atop motor driven roller 38 for centrifugal casting of a new motor frame. By maintaining the diameter of annular plates 12 constant within a range of frame sizes, the casting speed of different diameter frames can remain substantially unchanged reducing the number of process modifications required for each change in frame size being cast. Moreover, because the molds are not fixedly secured to the drive source, the mold can be easily removed to permit stripping of the mold sections while a second frame is being centrifugally cast. The self-supporting nature of each mold section and the ability of the sections to be rapidly reassembled without leakage (due to the coarse self-centering action of arcuate segments 12A–12D and the fine self-centering action produced by the angular disposition by bolts 18 relative to both orthogonal steps at the edges of adjacent mold sections), a high degree of automation can be achieved in casting large diameter motor frames utilizing the mold of this invention.

What we claim as new and desire to secure by Letters Patent of the United States is:

1. A dismemberable mold for centrifugally casting cylindrical objects having protrusions extending outwardly therefrom said mold comprising a plurality of individual mold sections internally contoured to a substantially arcuate surface having grooves therein geometrically complimentary to the desired periphery of the object to be cast, means disposed along the outer surface of said mold sections for clamping said sections into a mechanically secure structure having a substantially cylindrical configuration and segmented annular plates disposed at axially spaced locations along the outer surface of said mold structure, individual segments of said plates being fixedly secured to individual sections of said mold at an attitude to form a circular outer periphery upon juxtaposition of said sections to permit rotation of said mold upon said segmented plates.

2. A dismemberable mold for centrifugally casting cylindrical objects according to claim 1 wherein said segmented annular plates are located at opposite ends of said mold segments, the outer surface of said plate extending radially beyond said mold clamping means and the radially inner surface of said plates terminating short of the axial center of said structure to provide an axial passage extending completely through said mold.

3. A dismemberable mold for centrifugally casting cylindrical objects according to claim 1 further including means fixedly secured along the outer surface of each mold section to permit application of force to said section in a direction tending to separate said section from the cast object.

4. A dismemberable mold for centrifugally casting cylindrical objects according to claim 3 further including an axial opening extending completely through said mold to receive an axially disposed arbor for fixedly retaining said mold in a vertical position.

5. A dismemberable mold for centrifugally casting cylindrical objects according to claim 1 wherein the inner diameter of said cylindrical mold is in excess of 10 inches.

6. A dismemberable mold for centrifugally casting cylindrical objects having an irregular outer periphery, said mold comprising at least three individual mold sections positionable relative to each other to form a circularly closed structure, segmented plates fixedly secured to opposite ends of said mold sections, said plates lying in a plane perpendicular to the axis of said circularly closed structure and being dissected along approximately radially extending lines to coarsely position said mold segments relative to each other upon the application of an inwardly directed force to the outer surface of said mold, and means disposed along the outer surface of said mold sections for finely positioning said mold sections by the application of force to said mold sections at an angular disposition relative to at least two faces along the edges of said mold sections.

7. A dismemberable mold for centrifugally casting cylindrical objects according to claim 6 wherein the edges of the mold sections are approximately orthogonally stepped and said fine positioning means applies a force to the edges of said mold sections at an approximately 45° angle relative to both faces forming the orthogonal step to obtain two dimensional movement of one mold section relative to a second mold section.

8. A dismemberable mold for centrifugally casting cylindrical objects according to claim 6 wherein said fine positioning force applied to said mold units is disposed at an orthogonal attitude relative to the approximately radially extending dissections in said plate.

9. A dismemberable mold according to claim 8 further including means secured along the outer surface of each mold section to permit application of a force to said section in a direction tending to separate said section from the cast object.

10. A dismemberable mold for centrifugally casting cylindrical structures having protrusions extending outwardly therefrom, said mold comprising a plurality of individual mold sections disposed with edges of adjacent sections in juxtaposition to form a circularly closed structure, arcuate segments fixedly secured to opposite ends of each mold section to form a mold unit, said segments extending radially beyond the outer surface of said mold sections to form a substantially continuous circular surface at opposite ends of said mold when said sections are in an abutting disposition, the radially inner edge of said annular segments terminating short of the axial center of said mold to provide an axial opening completely through said mold and means disposed adjacent the edges of each mold unit for securing said units into a mechanically secure structure.

11. A dismemberable mold for centrifugally casting cylindrical structures according to claim 10 wherein said mold is formed of four individual sections and each annular segment terminates along an edge disposed parallel to the radii subtending the mold sections.

12. A dismemberable mold for centrifugally casting cylindrical structures according to claim 11 wherein said individual mold sections are characterized by an inner surface having a plurality of approximately equally spaced notches extending substantially the axial length of said mold section, each notch protruding inwardly of said mold section at a draft angle between 3° and 5° to form axial fins along the cast structure.

13. A dismemberable mold for centrifugally casting large diameter cylindrical structures having protruding fins along the outer surface of the structure, said mold comprising a plurality of individual mold sections disposed with the edges of adjacent sections in abutting disposition to form a circularly closed structure, an arcuate segment fixedly secured to opposite ends of each said section, said segments extending radially in opposite directions from said mold sections to permit unsupported standing of each said mold section upon the attached arcuate segment, the radially outer periphery of said arcuate segments forming a substantially continuous circular surface at opposite ends of said mold when said sections are disposed in an abutting attitude and the radially inner edge of said arcuate segments terminating short of the axial center of said mold to provide an axial opening completely through said mold and means disposed along the outer surface of said mold sections to permit application of a lateral force to said sections to strip said sections from the cast structure.

* * * * *